Jan. 12, 1971 W. C. ROGERS 3,553,912
AIRCRAFT ANTENNA FITTINGS
Original Filed Oct. 22, 1965
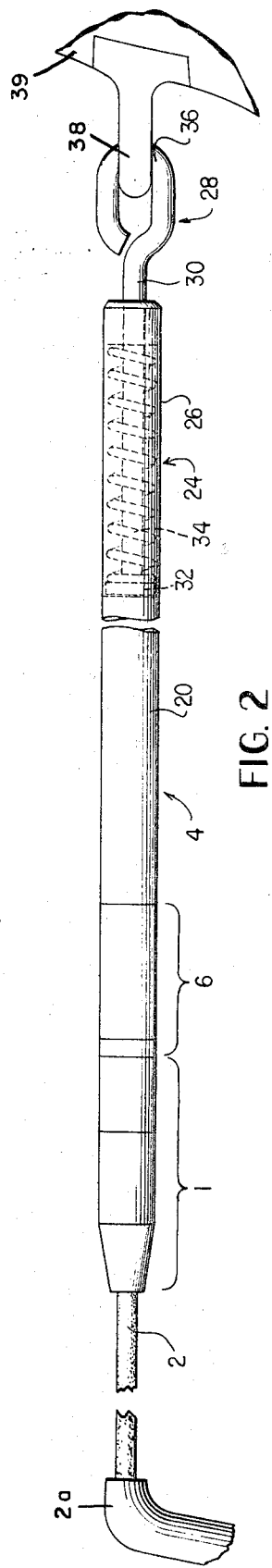
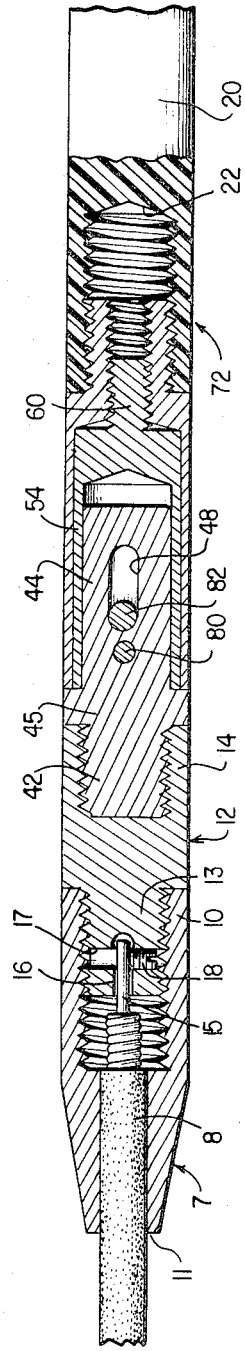
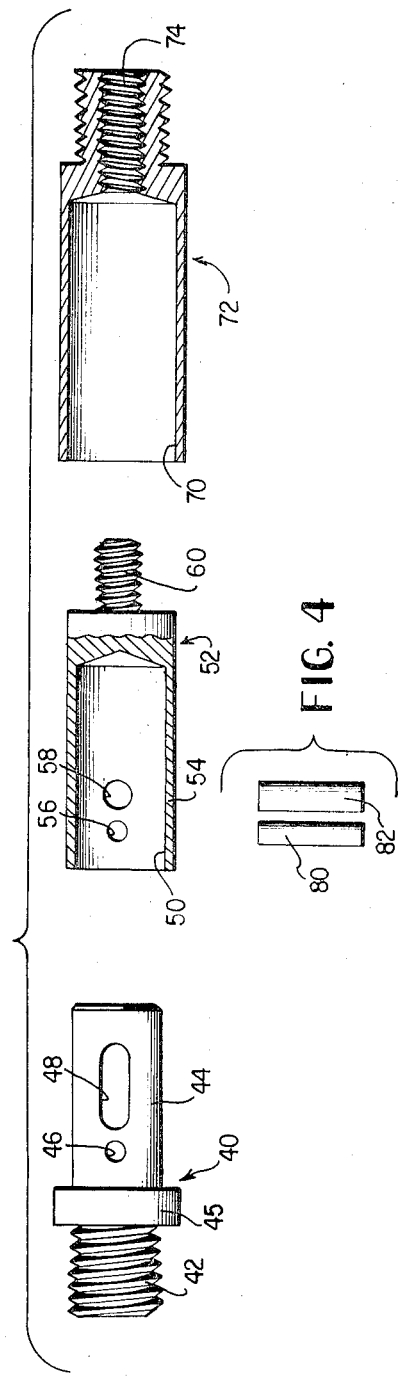
INVENTOR
WILLIAM C. ROGERS
BY *Burns, Doane, Benedict, Swecker, & Mathis*
ATTORNEYS.

United States Patent Office 3,553,912
Patented Jan. 12, 1971

3,553,912
AIRCRAFT ANTENNA FITTINGS
William C. Rogers, Miami Springs, Fla.
(P.O. Box 48–205, Miami, Fla. 33148)
Continuation of application Ser. No. 501,503, Oct. 22, 1965. This application May 16, 1968, Ser. No. 740,790
Int. Cl. H01q 1/08, 1/28
U.S. Cl. 52—98                                    10 Claims

ABSTRACT OF THE DISCLOSURE

A fitting for securing one end of an elongated antenna to an aircraft in which a frangible pin may be sheared to allow limited elongation of the fitting by a predetermined increase in tensile force in the fitting over the force sufficient to fully extend a spring biased tension unit. A housing having a smooth external periphery is provided for the fitting to minimize corona discharge problems.

---

This application is a continuation of co-pending application Ser. No. 501,503, filed Oct. 22, 1965, for Aircraft Antenna Fittings, and now abandoned.

BACKGROUND OF THE INVENTION

This invention relates to aircraft antenna systems which operate under environmental conditions subjecting the system to corona discharge effects and to extensible aircraft antenna fittings suitable for use therewith.

Under certain environmental conditions, corona discharge interferes with the performance of aircraft antenna systems. Corona discharge is an electrostatic discharge which results from the ionization of atmospheric air surrounding a conductor. Such discharge is particularly troublesome in an aircraft antenna system environment because it causes, among other adverse effects, radio interference or static. It has been ascertained that the smaller the radius of curvature of a conductor, the greater corona discharge therefrom is liable to be. For this reason, a potentially troublesome source of appreciable corona discharge are antenna system fittings which may include projections of a small radius. Further, such aircraft antenna systems must maintain their structural integrity in spite of, and make allowance for, loads imposed by extreme air turbulence and temperature variations to which they are sometimes subjected, as well as substantial shocks induced by hard aircraft landing. It is important that the aircraft antenna wire per se be maintained in a taut operational condition but nevertheless be protected against rupture as, for example, occasioned by the environmental factors noted heretofore.

With these requirements in mind, it is a principal object of this invention to provide an aircraft antenna fitting which minimizes corona discharge problems and is suitable to maintain aircraft antenna system structural integrity.

More specifically, it is an object of this invention to provide an extensible aircraft antenna fitting wherein exposed, small radius projections are minimized.

Another object of this invention is to provide an extensible aircraft antenna system fitting adapted to maintain an aircraft antenna wire in a taut operational condition but which protects the wire from rupture by freely permitting a predetermined increase in the effective length thereof upon the occurrence of a predetermined load.

Still another object of this invention is to provide an extensible aircraft fitting which may be conveniently assembled and disassembled for maintenance thereof.

In achieving these and other objects, as will be apparent hereinafter, one embodiment of the present invention provides an aircraft antenna fitting comprising an antenna wire anchoring assembly adjacent one end of said fitting, an antenna wire supporting assembly adjacent the other end of the fitting, and connecting means connecting the anchoring and supporting assemblies. The connecting means comprises first stop means constructed of a frangible material restricting relative movement of said anchoring and supporting assemblies away from each other, the first stop means being designed to fail upon exertion of a predetermined force tending to separate the anchoring and supporting assemblies. To maintain fitting structural integrity, a second stop means is provided, the second stop means freely permitting a limited amount of relative movement of the anchoring and supporting assemblies away from each other but securing said anchoring and supporting assemblies against movement away from each other after the occurrence of the said limited amount of movement.

To minimize corona discharge problems and to maintain stop means positioning, the fitting may include housing means having a smooth external periphery for encasing the first and second stop means and any projecting portions thereof.

THE DRAWINGS

A further understanding of the present invention may be gained by reference to the following detailed specification and the drawing forming a part thereof, wherein:

FIG. 1 is an elevational view of an extensible aircraft antenna fitting embodying the present invention;

FIG. 2 is a cross-sectional view of a portion of the aircraft antenna fitting shown in FIG. 1;

FIG. 3 is an exploded view of certain elements of the antenna fitting shown in FIG. 2 and an extensible connection therebetween; and FIG. 4 is a perspective view of stop pins utilized in the fitting shown in FIG. 2.

THE PREFERRED EMBODIMENT

Referring in more detail to FIG. 1 of the drawings, an aircraft antenna fitting encompassed by the present invention comprises an aircraft antenna wire supporting assembly 1 adapted to receive and be fixedly connected to one end of an antenna wire 2 secured in any conventional manner to a portion 2a of the aircraft. At the opposite end of an antenna fitting, an anchoring assembly 4 is positioned, the anchoring assembly being connected to the supporting assembly by an extensible connector assembly 6.

The antenna wire supporting assembly 1 comprises a generally bullet-shaped cap 7 fabricated from electrically-conductive material. The cap 7 includes a longitudinally extending antenna wire receiving bore 8 and a cylindrical cap barrel 10. The wire receiving end of the cap enlarges gradually from a relatively constricted terminus 11 to smoothly merge with the cap barrel 10. The interior of the cap barrel 10 is provided with threads to threadedly receive a wire adapter 12 which is also constructed of electrically conductive material. The wire adapter 12 includes an antenna wire holding mandrel 13 extending from a cylindrical adapter barrel 14 of a relatively increased diameter. The external periphery of the wire holding mandrel 13 and the inner periphery of the adapter barrel 14 is provided with threads to threadedly engage the adjacent elements.

A stripped end of the insulated antenna wire 2 is received in the wire receiving bore 8 of the cap 7 and is secured in the wire holding mandrel 13 by a conventional transverse pin arrangement. In this arrangement, the stripped end of the wire 2 to be secured to the mandrel 13 is twisted into a small loop 15 and positioned within a longitudinal slot 16 in the end of the mandrel 13 such that its opening is aligned with a transverse bore 17 which extends transversely of the slot 16. Through this bore an antenna wire end securing pin 18 is passed to intersect the opening in the wire loop 15. The adapter barrel 14 is externally configured to smoothly merge with the cap 7 when these elements are assembled with the adapter mandrel 13 threaded into the cap barrel 10.

The anchoring assembly 4 includes an insulator 20 having a cylindrical exterior constructed of electrically nonconductive material. The insulator includes a longitudinally extending threaded bore 22 on the inner end thereof. As shown in FIG. 1, on the outer end of the insulator 20 a coil spring type tension unit 24 is fixedly connected in any suitable manner. The tension unit 24 comprises a metallic cylindrical housing 26 having a hollow exterior in which is slidably positioned a plunger assembly 28. The plunger assembly 28 comprises an elongated shaft 30 having a plunger 32 of an increased diameter on the inner end thereof. A coil spring 34 of the compression type is positioned about the shaft 30 within the housing 26 to maintain the antenna wire in a taut condition. The outer end of the shaft 30 includes an eye 36 adapted to secure the antenna wire to an antenna post 38 of the aircraft tail section 39, or the like. Upon the occurrence of a force tending to elongate the fitting, the spring 34 may be compressed and the shaft 30 moved out of the housing 26 with the plunger bottoms on the fully compressed spring.

Connecting the supporting assembly 1 to the anchor assembly 4 is an extensible connector 6. Referring to FIG. 3, the extensible connector generally comprises a piston assembly 40 having a reduced diameter, threaded connector 42 on one end thereof and a cylindrical piston 44 on the other end thereof. A circular shoulder 45 of a relatively increased diameter separates these elements. The cylindrical piston 44 is provided with a transverse bore or opening 46 adjacent to, but spaced from, an elongated transverse slot 48 of a somewhat increased diameter to receive pins, as discussed hereinafter. The threaded connector 42 is threadedly received in the threaded bore in the adapter barrel 14 so that the exteriors of the shoulder 45 and the barrel 14 smoothly merge. The piston 44 of the piston assembly 40 is slidably received in a smooth internal bore 50 of a piston cylinder assembly 52. The piston cylinder includes a generally cylindrical wall 54, opposite sides of which are provided with a first transverse opening 56 adjacent to, but spaced from, a second transverse opening 58 of an increased diameter. On the other end of the piston assembly 52, a threaded connector 60 of a reduced diameter is provided.

The entire piston cylinder assembly 52 is positioned within a smooth internal bore 70 in an outer housing 72 with the threaded connector 60 of the cylinder assembly 52 threadedly received in a threaded bore 74 on the opposite end of the housing assembly 72. The outer periphery of this opposite end of the housing 72 is of a reduced diameter and is provided with threads for threadedly connecting the housing 72 within the threaded bore 22 of, and to smoothly merge with, the insulator 20 of the anchor unit 4. The largest outside diameter of the outer housing 72 matches the outside diameter of the circular shoulders 45 on the piston assembly 40 so that, when assembled, the exteriors of these elements smoothly merge.

To connect the piston assembly 40 to the piston cylinder assembly 52, first and second pins 80 and 82 are provided, as shown in FIG. 4. The first pin 80, which is constructed of frangible material, is slidably positioned within the bore 46 in the piston 44 so that the extremities thereof project into the opposed openings 56 in the circular walls of the cylinder assembly 52. Similarly, the second pin 82, which is of increased diameter relative to the pin 80, is slidably positioned in the forward end of the elongated slot 48 so that the extremities thereof project into the opposed openings 58 in the cylindrical walls 54 of the cylinder assembly 52. The pins 80, 82 are retained in this position by the outer housing 72. In the preferred embodiment, the second pin 82 is substantially stronger in shear strength than is the first pin 80. Additionally, it should be noted that the strength of the second pin 82 in shear is less than the strength of the antenna wire 2 in tension and also less than any force that is liable to damage the elements of the aircraft to which the antenna wire is anchored.

After full compression of the spring 24 and upon the exertion of a predetermined force on the fitting as, for example, caused by deflection of the antenna wire 2, the extremities of the frangible first pin 80 received within the openings 56 and abutting the walls thereof will be sheared off and the piston 44 permitted to slide within the bore 50 away from the cylinder 52 to an extent permitted by movement of the second pin 82 away from the forward end to abutment with the rearward end of the elongated slot 48. Further elongation of the fitting is prohibited by the second pin 82 when it abuts the rearward end of the slot 48.

In the preferred embodiment, the frangible first pin 80 is designed to shear on the exertion of approximately 200 pounds. The second pin 82, of a relatively increased diameter, is designed to withstand forces at least twice as great as the forces causing shearing of the frangible first pin 80. Upon shearing of the extremities of pin 80, the elongation of the slot 48 permits the second pin 82 to slide approximately 3/16". However, it will be appreciated that the design strength of the pins 80 and 82, as well as the length of the elongated slot 48, will depend upon the design requirements of the particular antenna system in which the device is utilized.

It should be noted that when the pins 80 and 82 are inserted in the appropriate openings, the piston assembly is received within the cylinder assembly 52, and the cylinder assembly 52 is positioned within the bores 70 of the outer housing 72, the walls of the outer housing 72 serve to restrain transverse movement of the pins 80, 82. However, the outer housing has the additional function of shielding the small radius elements of the piston and cylinder assemblies so as to reduce corona discharge therefrom. This shielding function is particularly beneficial in an aircraft antenna environment.

Upon shearing of first pin 80, replacement of this pin is a convenient matter by merely removing the cylinder assembly 52 from the outer housing 72 and slidably removing the pin from the openings.

Although the present invention has been disclosed for use with a particular type of antenna fitting, it should be noted that other types of supporting and anchoring assemblies may be utilized. In some instances, it may be desired to eliminate the insulator portion 20, as well as the tension unit assembly 24, from the fitting.

By the provision of an extensible aircraft antenna fitting of the type heretofore described, an antenna wire may be protected against rupture. Upon the occurrence of a force which might cause the wire to part, as might be occasioned by turbulence induced differential movement of elements of the aircraft to which the wire is connected, the first stop pin will be sheared off, permitting a predetermined and limited increase in the effective length of the wire. Circumvention of wire rupture is particularly beneficial because, in aircraft flight, a free flapping end of a wire might damage an aircraft.

Further, it is sometimes the case that the strength of the antenna wire is greater than the strength of the elements of the aircraft to which the wire is anchored. Under such circumstances and without the provision of the present invention, upon the occurrence of extraordinarily great forces on the wire, the elements of the aircraft to which the wire is anchored might be torn away or damaged before the wire ruptures. However, the present invention circumvents this possibility because the second stop pin 82 is designed to have a shear strength less than the strength of the wire in tension and less than any force that might cause damage to the elements of the aircraft to which the wire is anchored. Upon the occurrence of such extraordinary forces, both the stop pins 80, 82 will shear off and the elements of the aircraft to which the wire is anchored are protected against damage.

Although the present invention has been described with reference to a single preferred embodiment, it will be apparent that various modifications, substitutions, and additions may be made in the preferred embodiment which will be encompassed by the scope of this invention as defined in the following claims.

1. In combination,
    an aircraft;
    an elongated antenna secured at one end to a portion of said aircraft;
    a first member secured to a second portion of said aircraft in tensile force transmitting relationship;
    a second member secured to said antenna in tensile force transmitting relationship;
    first frangible stop means interconnecting said members in tensile force transmitting relation, said means preventing the separation of said members under tensile force insufficient to shear said means; and
    second stop means interconnecting said members to maintain said members in tensile force transmitting relation upon the shearing of said first stop means, while permitting the limited separation of said members to reduce the tensile force between said portions of said aircraft.

2. The combination of claim 1 including housing means encasing at least one of said members throughout its axial length, said housing means having a smooth external periphery.

3. The combination of claim 1 wherein said second stop means has a shear strength greater than said first stop means but less than the shear strength which would permit damage to said portions of said aircraft.

4. The combination of claim 1 wherein said first and second members coaxially telescope with respect to each other,
    wherein said first stop means comprises means projecting transversely from one of said members into abutment with abutment means on the other of said members, and
    wherein said second stop means comprises means projecting transversely from one of said members and slidably contacting means on the other of said members, said last mentioned means permitting a predetermined amount of axial movement between said members.

5. The combination of claim 4 wherein said first stop means prevents rotational movement between said members, and including housing means having a smooth external periphery and encasing said members over their telescoped portions to limit the transverse movement of said projecting means, said housing means being rotatably secured to one of said members on force transmitting relation.

6. The combination of claim 5 wherein said first member includes a spring biased tension unit and wherein said first projecting means has a shear strength sufficient to withstand the tensile force necessary to fully extend said tension unit.

7. The combination of claim 1 wherein said first member includes a spring biased tension unit and wherein said first stop means has a shear strength sufficient to withstand the tensile force necessary to fully extend said tension unit.

8. The combination of claim 6 wherein said first member includes a cylinder having a pair of axially spaced transverse apertures,
    wherein said second member includes a piston slidably disposed within said cylinder, said second member having a transverse aperture aligned with one of the apertures in said cylinder and a transverse slot aligned with the other of the apertures in said cylinder, said slot being axially elongated and extending axially toward said second portion of said aircraft.
    wherein said first stop means comprises a pin slidably received in the aligned apertures of said piston and cylinder, and
    wherein said second stop means comprises a pin slidably received in the aligned aperture of said piston and said slot in said cylinder.

9. The combination of claim 7 including housing means encasing said cylinder over its axial length, said housing means having a smooth external periphery and limiting the transverse movement of said pins with respect to said piston and said cylinder.

10. The combination of claim 8 wherein said second pin has a shear strength greater than the shear strength of said first pin and less than the shear strength sufficient to permit damage to said portions of said aircraft.

References Cited

UNITED STATES PATENTS

| | | | |
|---|---|---|---|
| 2,522,790 | 9/1950 | Johnston | 24—230.1 |
| 2,823,379 | 2/1958 | Novak | 343—707 |
| 3,135,511 | 6/1964 | Norman et al. | 343—705X |
| 3,186,745 | 6/1965 | Lyles | 285—277X |
| 3,319,846 | 5/1967 | Wolf | 287—58CTX |

FOREIGN PATENTS

| | | | |
|---|---|---|---|
| 903,137 | 8/1962 | Great Britain | 52—98 |

PRICE C. FAW, JR., Primary Examiner

U.S. Cl. X.R.

52—110; 285—2; 343—707